US007918437B2

(12) United States Patent
Ackermann

(10) Patent No.: US 7,918,437 B2
(45) Date of Patent: Apr. 5, 2011

(54) PRESSURE VESSEL

(75) Inventor: Norbert Ackermann, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 526 days.

(21) Appl. No.: 12/072,035

(22) Filed: Feb. 22, 2008

(65) Prior Publication Data

US 2008/0202945 A1 Aug. 28, 2008

(30) Foreign Application Priority Data

Feb. 23, 2007 (DE) ......................... 10 2007 009 370
Dec. 5, 2007 (DE) ......................... 10 2007 058 544

(51) Int. Cl.
*F16F 9/04* (2006.01)

(52) U.S. Cl. ................... 267/64.27; 267/218; 267/64.19

(58) Field of Classification Search ............... 267/64.17, 267/DIG. 2, 64.16, 218, 64.19, 64.27; 188/322.21, 188/300, 315, 318, 322.16, 322.17, 285, 352, 286, 287, 289, 322.19, 297, 298
See application file for complete search history.

(56) References Cited

U.S. PATENT DOCUMENTS

| | | | | |
|---|---|---|---|---|
| 2,997,291 | A * | 8/1961 | Stultz | 188/266 |
| 3,285,596 | A | 11/1966 | Burgert | |
| 3,945,663 | A * | 3/1976 | Duckett | 280/6.159 |
| 6,450,307 | B2 | 9/2002 | Lutz | |
| 6,648,309 | B2 * | 11/2003 | Beck | 267/64.17 |

* cited by examiner

*Primary Examiner* — Melanie Torres Williams
(74) *Attorney, Agent, or Firm* — Cohen Pontani Lieberman & Pavane LLP

(57) ABSTRACT

Pressure vessel filled with at least one medium, where a gas mass enclosed by an envelope is pre-pressurized by a fluid, especially for volume compensation in piston-cylinder assemblies. The separating means is provided in an annular space, which is bounded by an interior wall and an exterior wall, and where at least one port for the annular space and at least one port for the enclosed gas mass are provided. The ports are aligned when the piston-cylinder assembly is inserted in the pressure vessel, which moves seals into their sealing positions.

15 Claims, 6 Drawing Sheets

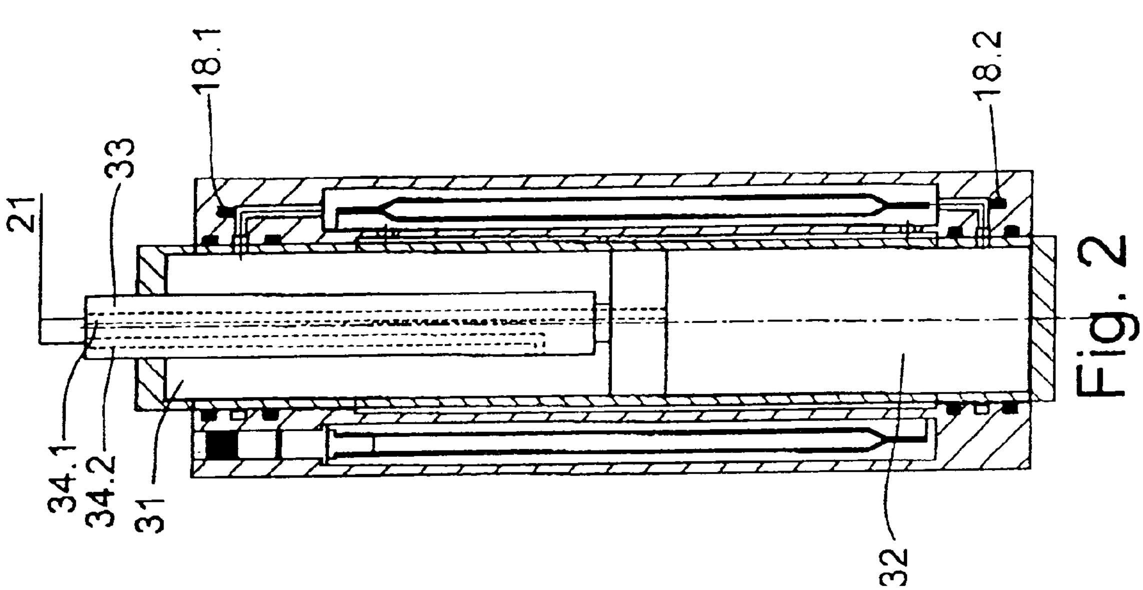
Fig. 2
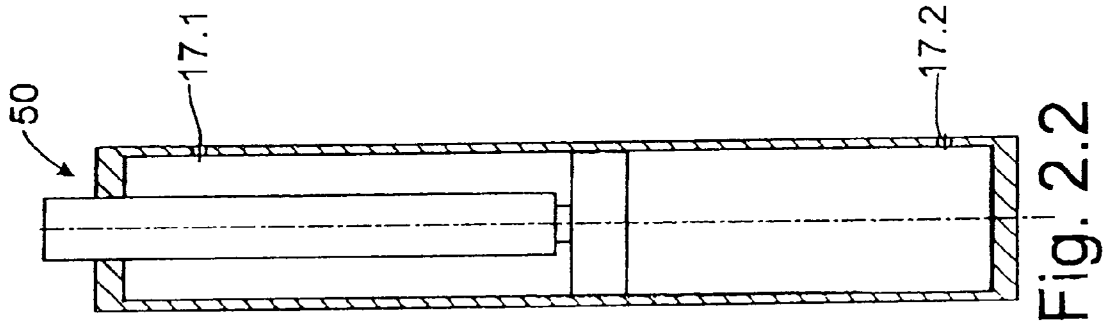
Fig. 2.2
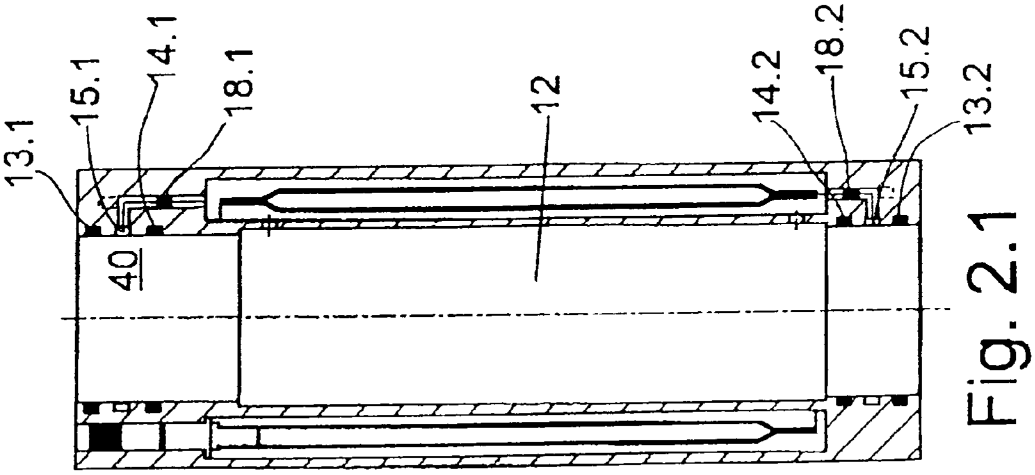
Fig. 2.1

Fig. 2.3
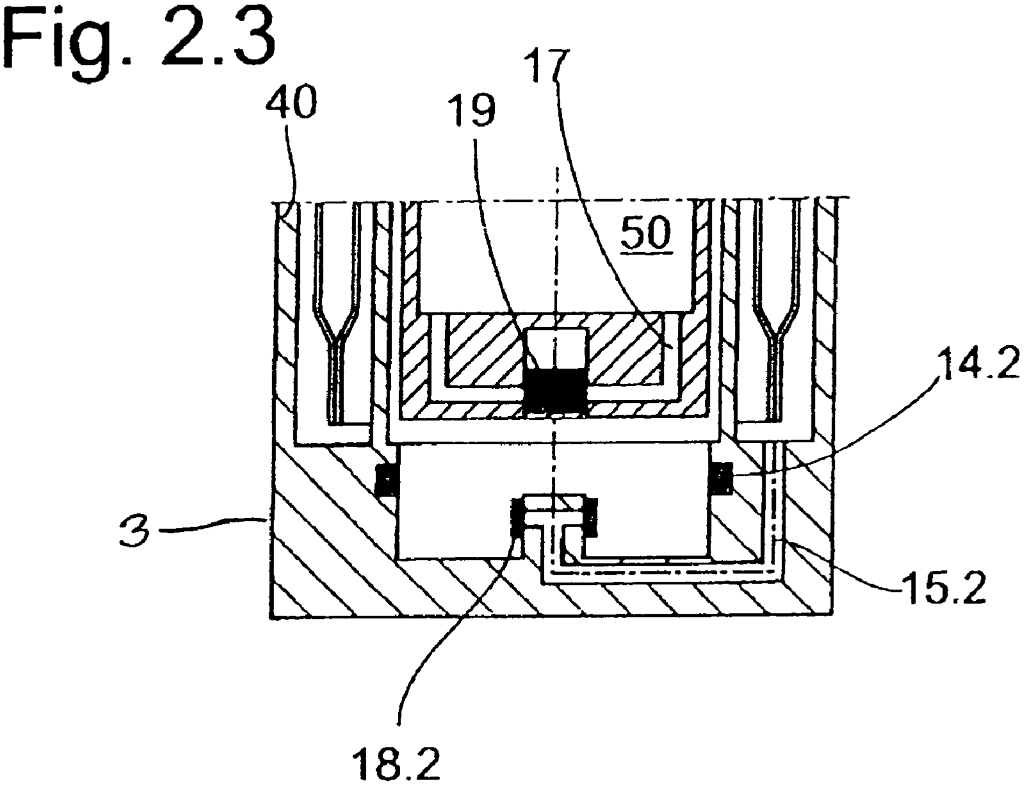
Fig. 2.4
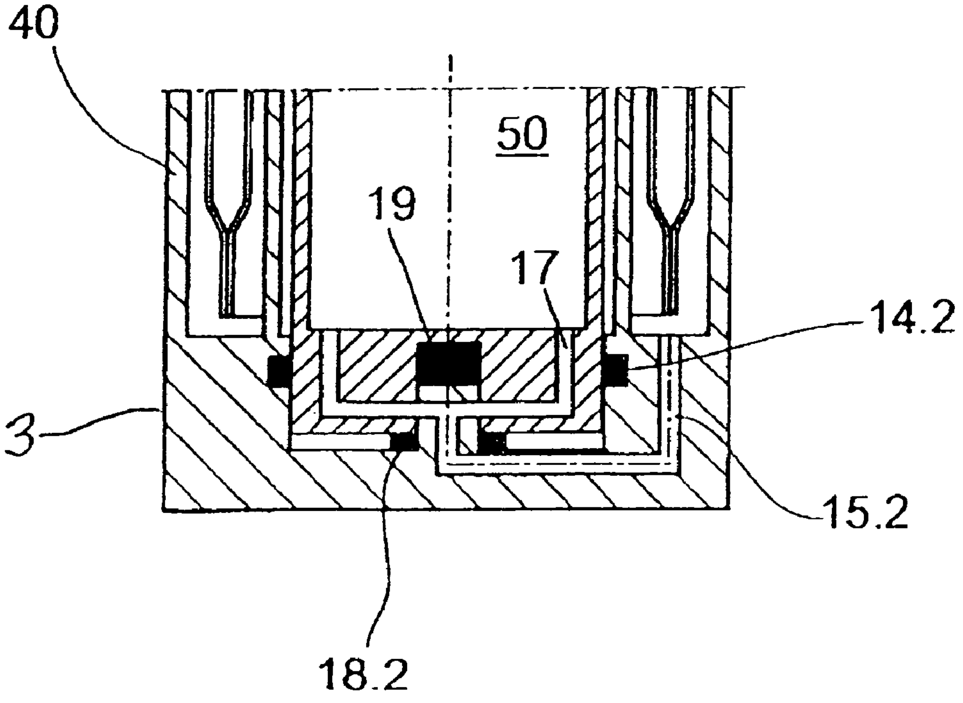

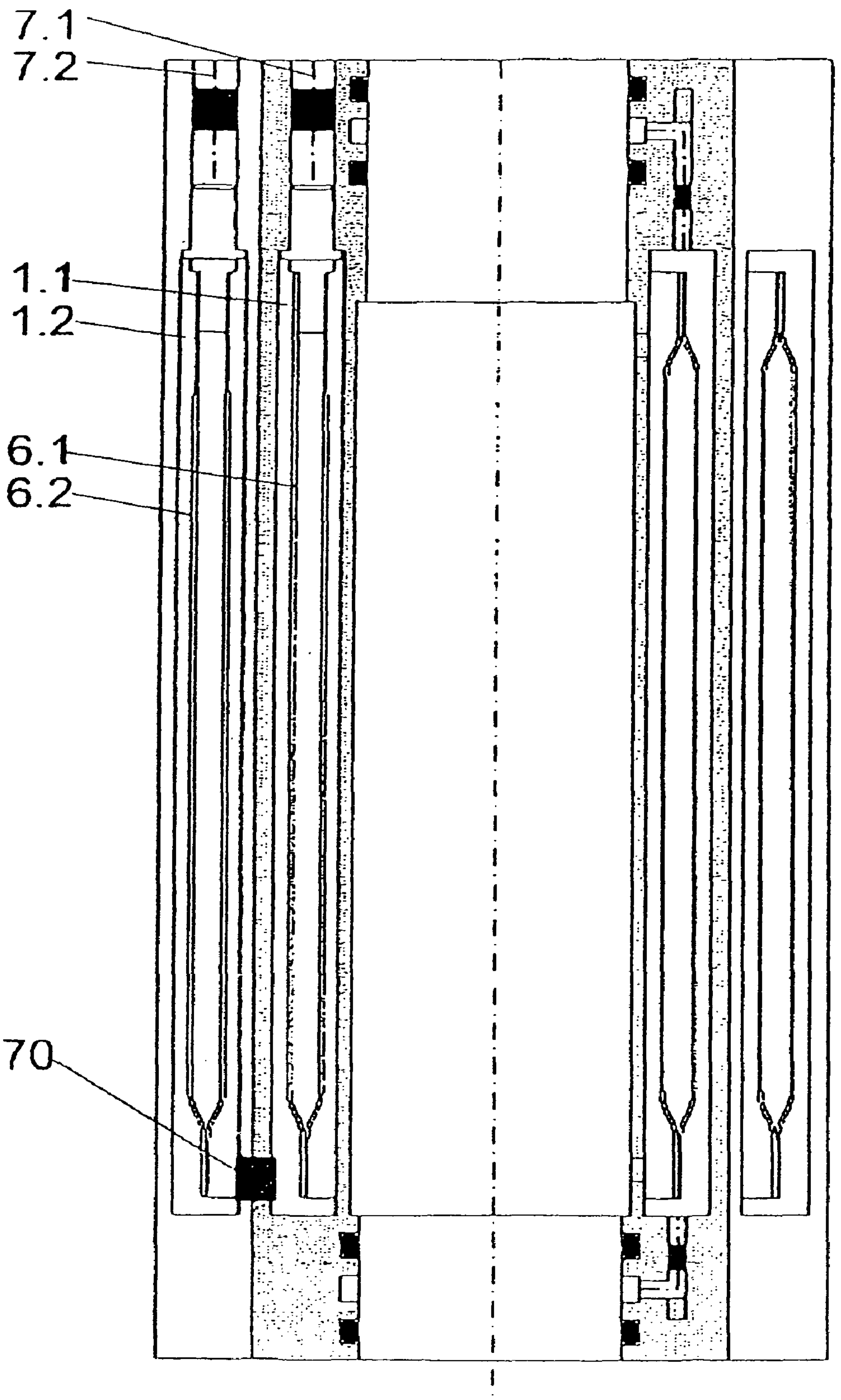
Fig. 2.5

PRESSURE VESSEL

BACKGROUND OF THE INVENTION

1. Field of the Invention

The invention pertains to a pressure vessel filled with at least one medium, where a gas mass is pre-pressurized by a fluid with the help of a barrier, especially for volume compensation in, for example, piston-cylinder assemblies.

2. Description of the Related Art

Pressure vessels are already known (e.g., U.S. Pat. No. 6,450,307, U.S. Pat. No. 3,285,596, GB 15,860) in which the pressure vessel is adapted to correspond to the design of a vibration damper or of some other type of piston-cylinder assembly. The design features are adapted and coordinated exactly to the other component in question.

SUMMARY OF THE INVENTION

An object of the invention is to create a pressure vessel which can be used to store gas and/or oil for the hydraulic system of a vehicle, for mobile hydraulic systems, or for similar applications; which is compact in design; and which can be used in various systems.

According to the invention, the barrier is provided in an annular space, which is bounded by an interior wall and an exterior wall, and where at least one port for the annular space and at least one port for the enclosed gas mass are provided.

The advantage is that, by providing the appropriate number of ports, the vessel can be used not only generally in the vehicle but also adapted to a wide variety of systems in the vehicle.

According to an essential feature, the port of the annular space is connected to an internal or external supply unit. So that the pressure vessel can be designed in the form of, for example, a hydraulic spring strut, and so that the supply unit can act independently of the pressure vessel, this can be designed in such a way that the supply unit can be inside the pressure vessel component or can be installed as an independent, external component in some other location in the vehicle. The supply unit includes at least the appropriate ports, a pump component, a control unit, and a reservoir, from which the pump unit, under the control of the control unit, can transport an appropriate medium from the reservoir to the pressure vessel.

According to another essential feature, the port for the enclosed gas mass is accessible from outside the annular space.

An essential feature is that at least one port can be closed. This offers the advantage that both the pressure vessel assembly and the supply unit assembly can be closed off independently of each other or individually by means of appropriately closable ports, so that both the pressure vessel with the enclosed gas mass and the supply unit can be built, filled, tested, stored, and/or transported independently of each other.

According to another embodiment, at least part of the interior wall of the annular space is cylindrical, and a piston-cylinder assembly can be inserted into this at least partially cylindrical interior space. It is advantageous for the ports of the annular space and/or of the enclosed gas mass to be compatible with corresponding ports of the piston-cylinder assembly. It therefore becomes easy to accommodate vibration dampers, telescope dampers, and/or spring cylinders in this cylindrical interior space, which then can communicate with each other via the ports, which can be opened and closed, and thus form a complete structural unit.

According to a further embodiment, the gas mass is enclosed by an envelope body or membrane of changeable shape, possibly with the help of the interior and/or exterior wall. The membrane can be one of the known membranes such those used in self-pumping spring struts or in pneumatic springs of a vehicle, whereas, as the shape-changing envelope body, gas containers such as those described in DE 100 29 150 C1 can be used.

In an embodiment of the invention, the piston-cylinder assembly consists of a vibration damper, a self-pumping spring strut, or the like.

So that a structural unit including a pressure vessel and a piston-cylinder assembly can be designed compatibly, it is provided in accordance with a favorable embodiment that appropriate seals are provided between the cylindrical interior wall of the pressure vessel and the cylindrical outer wall of the piston-cylinder assembly. These seals are explained in greater detail in the detailed description.

In addition, a valve device for maintaining the desired pressure is provided between the pressure vessel and the piston-cylinder assembly.

According to an embodiment which is favorable with respect to installation, an arrangement of ports and seals is provided, which, when the pressure vessel and the piston-cylinder assembly are brought together, can be changed relative to each other by effective means, so that the corresponding ports are connected to each other and simultaneously sealed off toward the outside.

According to another essential embodiment, the annular space is divided into at least two chambers, and in that at least one separating means is provided in each chamber. It is advantageous here for the two separating means to be fillable either individually or jointly.

In addition, an element is provided by means of which the chambers can be connected to or separated from each other or a consumer, preferably a piston-cylinder assembly, as desired.

According to an embodiment which is favorable in terms of design and manufacturing, the chambers are concentric to each other.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 2, 2.1, and 2.2 show sections through a pressure vessel, through a piston-cylinder assembly, and through a combination of these two components;

FIGS. 2.3 and 2.4 show detailed views of the bottom area between the pressure vessel and the piston-cylinder assembly;

FIG. 2.5 shows a pressure vessel with two chambers in the annular space;

DETAILED DESCRIPTION OF THE PRESENTLY PREFERRED EMBODIMENTS

Figure 1:
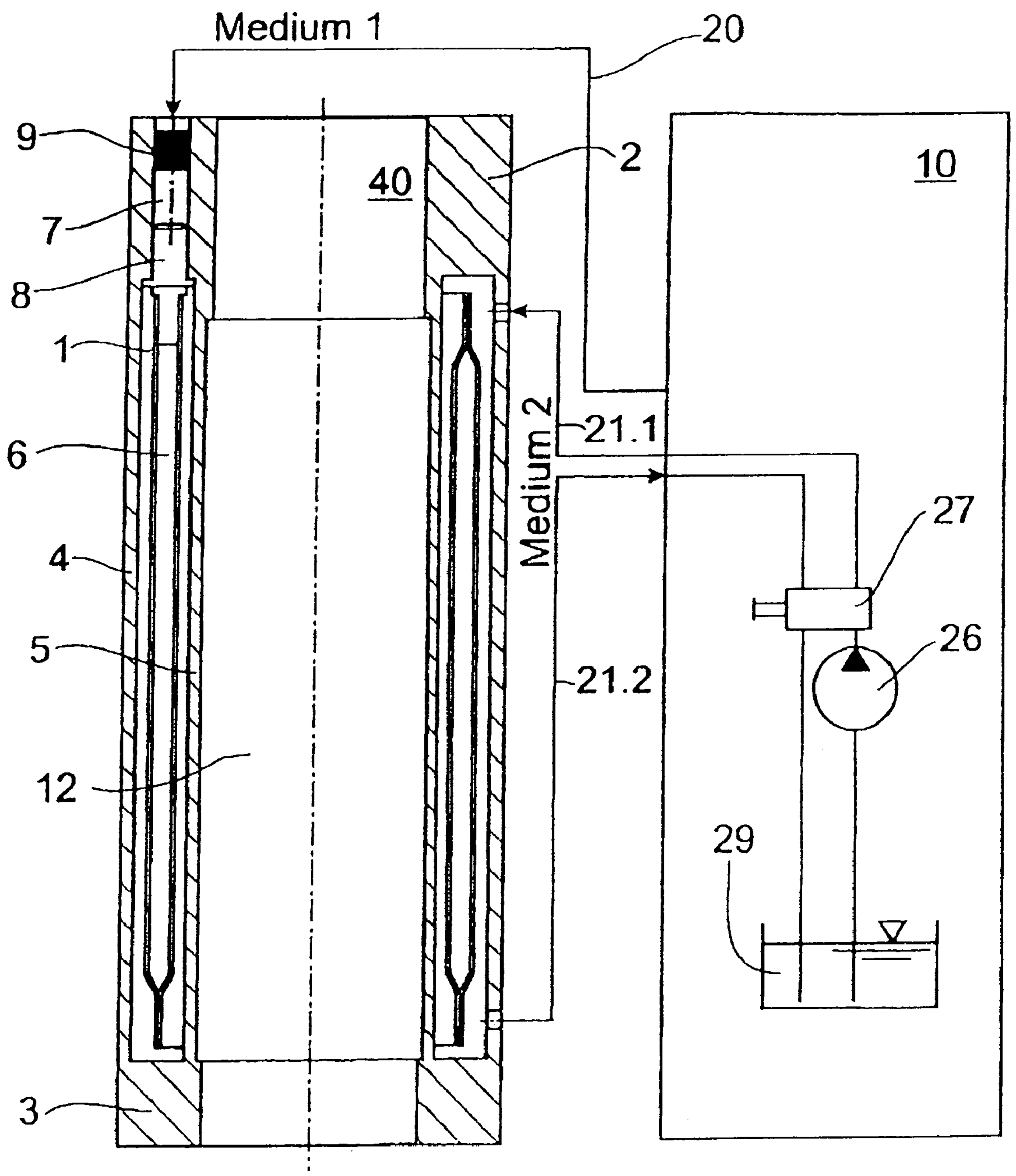
FIG. 1 shows a cross section through a pressure vessel with an external supply unit.

The hydraulic pressure vessel shown in FIG. 1 consists essentially of an annular storage space 1, a cover part 2, and a bottom part 3. The interior wall 5 and the exterior wall 4 form the boundaries of the annular storage space 1, where, in this annular storage space 1, a barrier 6 in the form of an envelope body of changeable shape is provided. The separating means is provided with a port piece 8, a filling channel 7, and a plug piece 9. The annular storage space 1 can be filled with hydraulic fluid, and the separating means can be filled with gas via the filling channel 7. The connecting lines 21.1 and 21.2 can be closed; the connecting line 20 leading to the envelope body can also be closed.

Figure 3:
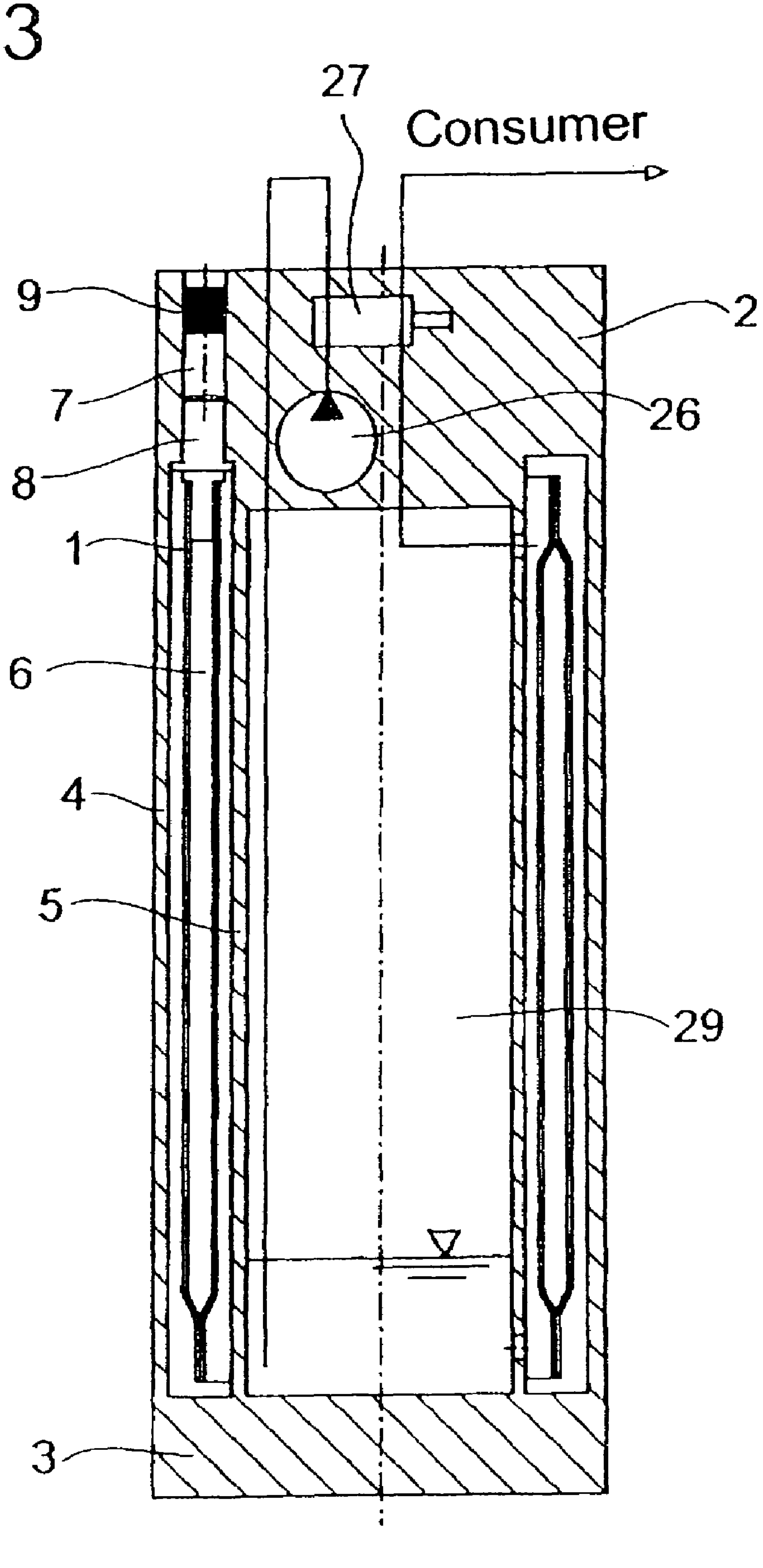
FIG. 3 shows a pressure vessel with an internal supply unit.

The connecting lines 20, 21.1, and 21.2 are connected to a supply unit 10, which contains a pump component 26, a control unit 27, and a reservoir 29. This supply unit 10 is installed externally, as a separate assembly, but it can also be installed inside the pressure vessel as shown in FIG. 3.

FIG. 2.1 shows a schematic diagram of a pressure vessel, similar to that already shown on the left in FIG. 1. The cylindrical interior wall 5 is provided with seals 13 and 14, whereas ports 15 and plugs 18.1, 18.2 are provided in the cover part 2 and in the bottom part 3.

FIG. 2.2 shows a piston-cylinder assembly 50 with closable ports 17.1 and 17.2, so that the piston-cylinder assembly can be inserted into the cylindrical interior space 12 of the pressure vessel 40, as shown in FIG. 2.

FIG. 2 shows accordingly the combination of these two components, so that, after the individual plugs 18.1, 18.2 have been removed to open the ports 17.1, 17.2 and the two components have been sealed off against each other by the seals 13, 14, a hydropneumatic component is created.

The overall assembly is filled via the connecting line 21, where appropriate channels 34.1 and 34.2 are provided in the piston rod 33 to allow the annular working space 31 and the cylindrical working space 32 to be filled.

It can be seen in FIGS. 2.3 and 2.4 that a bottom part 3 is provided in each case, where, after the pressure vessel 40 and the piston-cylinder assembly 50 have been assembled, appropriate seals 18.2, 19, and 14.2 are provided in the bottom part 3 (see FIG. 2.3), and after further insertion, these seals 18.2, 14.2, and 19 go into effect, as can be derived from FIG. 2.4.

In FIG. 2.3, the channel 15.2 is closed off by the seal 18.2, and channels 17 are closed off by the seal 19. When the piston-cylinder assembly is introduced far enough in the axial direction into the pressure vessel, the seal 19 is shifted and thus opens the channels 17. The seal 18.2 is also shifted and thus opens the channel 15.2. As a result, the individual components can be filled individually in a preparatory step and then tested, stored, and transported. Their channels are connected to each other as appropriate only after the components have been put together.

FIG. 2.5 shows a pressure vessel, in which the storage space is provided with two chambers 1.1 and 1.2. In each chamber 1.1 and 1.2, there is a barrier 6.1, 6.2, which can be filled through a filling channel 7.1, 7.2. It would also be possible, however, to provide a common filling channel 7 for both barriers 6.1, 6.2. Via the element 70, the chambers 1.1 and 1.2 can be connected to and separated from each other and/or a piston-cylinder assembly, for example.

FIG. 3 shows a pressure vessel in which the supply unit is located inside the component. The cover part 2, the bottom part 3, and the cylindrical interior wall 5 form the reservoir 29. Otherwise, this pressure vessel is the same as that shown in FIG. 1. The pump component 26 and the control unit 27 are mounted in the cover part 2.

Figure 4:
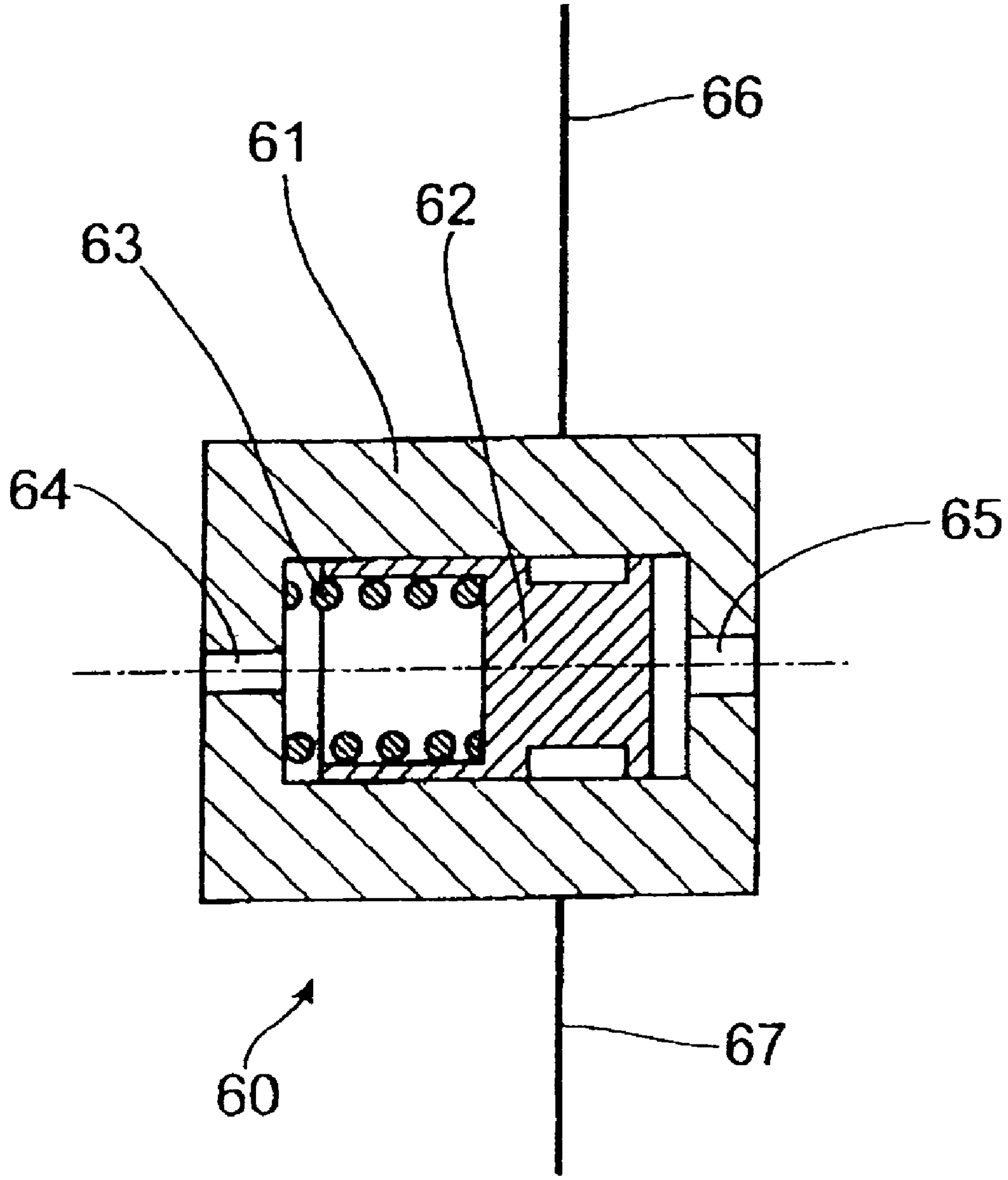
FIG. 4 shows a cross section through a valve device for use in at least one of the channels.

FIG. 4 shows a valve device 60, the flow connections 66 and 67 of which can be arranged in one of the channels 15, 17, or 34 according to FIGS. 2, 2.1, and 2.2 to ensure that, through the use of this valve device 60, the pressure in the pressure vessel does not fall below a preselected value. For this purpose, the valve device 60 has a housing 61 and a valve element 62, a spring element 63, a port 64 leading to the atmosphere, and a port 65 leading to the pressure vessel. The connection between the flow connection 66 and the flow connection 67 can be made or broken in correspondence with the ratio between the pressure being exerted on the effective working surface of the valve element 62 via port 65 and the atmospheric pressure acting via the port 64 together with the spring element 63.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure vessel assembly comprising a pressure vessel, the pressure vessel comprising:

an interior wall and an exterior wall bounding an annular space;

a barrier enclosing a mass of gas in the annular space, the barrier being pressurized by a fluid in the annular space;

at least one port communicating with the fluid in the annular space;

at least one port communicating with the mass of gas enclosed by the barrier;

a cover part bounding the annular space at a first end of the annular space;

a bottom part bounding the annular space at a second end of the annular space opposite the first end;

a channel arranged in the bottom part connecting the annular space by a first channel end to a cylindrical interior space defined by the interior wall by a second channel end;

a seal shiftably arranged at the second channel end to seal the channel.

2. The assembly of claim 1 further comprising a supply unit for supplying fluid to the annular space, wherein the supply unit is inside the pressure vessel.

3. The assembly of claim 1 further comprising a supply unit for supplying fluid to the annular space, wherein the supply unit is outside the pressure vessel.

4. The assembly of claim 1 wherein the port communicating with the gas mass is accessible from outside the annular space.

5. The assembly of claim 1 further comprising a piston-cylinder unit received in the interior space.

6. The assembly of claim 5 wherein the piston cylinder-unit has an exterior wall at least one port which aligns with at least one of said ports in said pressure vessel.

7. The assembly of claim 1 wherein the barrier comprises an envelope body having a shape which can be determined by the interior and exterior walls.

8. The assembly of claim 5 further comprising at least one seal between the exterior wall of the piston-cylinder unit and the interior wall of the pressure vessel.

9. The assembly of claim 5 further comprising a valve device between the pressure-vessel and the piston-cylinder unit, said valve device maintaining a desired pressure.

10. The assembly of claim 6 wherein the seal has a position which shifts as the piston-cylinder assembly is received in the interior space of the pressure vessel, whereby the ports are sealed off against the outside when they are aligned.

11. The assembly of claim 1 wherein the annular space is divided into at least two chambers, each said chamber having a barrier enclosing a gas mass.

12. The assembly of claim 6 wherein the pressure vessel wherein, said cover part has a port communicating with said annular space and a port communicating with said mass of gas enclosed by said barrier, said piston-cylinder unit having ports in said exterior wall which align with respective said ports in cover part and said bottom part of said pressure vessel when said piston cylinder unit is received in said interior space of said pressure vessel.

13. The assembly of claim 12 wherein said piston cylinder unit comprises a first working space and a second working space separated by a piston, one of said ports in said exterior wall communicating with said first working space and aligning with said port in said cover part, another one of said ports in said exterior wall aligning with said port in said bottom part.

14. The assembly of claim 5, wherein the piston cylinder-unit is configured to mate with the bottom part and open the channel by shifting the shiftable seal.

15. The assembly of claim 14, wherein the piston-cylinder unit comprises a piston-cylinder channel configured to mate with the second end of the channel to couple the annular space to a workspace of the piston-cylinder unit.

* * * * *